(12) United States Patent
Hara

(10) Patent No.: US 8,750,638 B2
(45) Date of Patent: Jun. 10, 2014

(54) IMAGE PROCESSING APPARATUS, IMAGE PROCESSING METHOD, AND COMPUTER PROGRAM

(75) Inventor: Takayuki Hara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 133 days.

(21) Appl. No.: 13/386,932

(22) PCT Filed: Jul. 22, 2010

(86) PCT No.: PCT/JP2010/062740
§ 371 (c)(1),
(2), (4) Date: Jan. 25, 2012

(87) PCT Pub. No.: WO2011/016375
PCT Pub. Date: Feb. 10, 2011

(65) Prior Publication Data
US 2012/0121203 A1 May 17, 2012

(30) Foreign Application Priority Data

Aug. 7, 2009 (JP) ................................. 2009-184763

(51) Int. Cl.
*G06K 9/40* (2006.01)
(52) U.S. Cl.
USPC .......... 382/255; 382/260; 382/274; 382/275; 358/3.26; 358/3.27; 358/463
(58) Field of Classification Search
USPC ......... 382/255, 260, 274, 275, 286; 358/3.26, 358/3.27, 463
See application file for complete search history.

(56) References Cited

U.S. PATENT DOCUMENTS

| 5,943,443 | A | 8/1999 | Itonori et al. | |
| 7,241,262 | B2 * | 7/2007 | Adler et al. | 600/130 |
| 7,356,408 | B2 * | 4/2008 | Tsuchiya et al. | 701/538 |
| 7,559,892 | B2 * | 7/2009 | Adler et al. | 600/180 |

(Continued)

FOREIGN PATENT DOCUMENTS

| CN | 1469635 A | 1/2004 |
| JP | 7-287692 A | 10/1995 |

(Continued)

OTHER PUBLICATIONS

Hiroshi Harashima, et al.,"e-Separating Nonlinear Digital Filter and Its Applications", The transaction A of the Institute of Electronics, Information and Communication Engineers, vol. J65-A, No. 4, pp. 297-304, Translation of Outline.

(Continued)

*Primary Examiner* — Yosef Kassa
(74) *Attorney, Agent, or Firm* — Dickstein Shapiro LLP

(57) ABSTRACT

An image processing apparatus includes a distance calculating unit that calculates a distance between first and second distributions, wherein the first distribution is a distribution of pixel values of pixels surrounding a focus pixel included in an image, the second distribution is a distribution of pixel values of pixels surrounding a pixel included in a window that includes the focus pixel at the center, and the second distribution is obtained for each pixel included in the window; a coefficient calculating unit that calculates, using the distance between the first and second distributions, a filter coefficient for each pixel included in the window; and a filter processing unit that calculates a correction value for the focus pixel by performing a filter process on each pixel included in the window using the filter coefficient.

10 Claims, 7 Drawing Sheets

(56) References Cited

U.S. PATENT DOCUMENTS

| | | | |
|---|---|---|---|
| 7,849,416 B2 * | 12/2010 | Chandhoke et al. | 715/771 |
| 7,876,931 B2 * | 1/2011 | Geng | 382/118 |
| 7,992,129 B2 * | 8/2011 | Chandhoke et al. | 717/109 |
| 8,014,034 B2 | 9/2011 | Hooper | |
| 8,023,764 B2 | 9/2011 | Miyake et al. | |
| 8,154,594 B2 * | 4/2012 | Seki et al. | 348/119 |
| 8,180,100 B2 * | 5/2012 | Fujimaki et al. | 382/100 |
| 8,228,560 B2 | 7/2012 | Hooper | |
| 8,306,357 B2 | 11/2012 | Miyake et al. | |
| 8,325,979 B2 * | 12/2012 | Taborowski et al. | 382/103 |
| 2007/0147661 A1 | 6/2007 | Fukaya et al. | |
| 2008/0175510 A1 | 7/2008 | Matsushita | |
| 2010/0141804 A1 | 6/2010 | Morel et al. | |

FOREIGN PATENT DOCUMENTS

| | | |
|---|---|---|
| JP | 10-74250 A | 3/1998 |
| JP | 2007-172237 A | 7/2007 |
| JP | 2007-288439 A | 11/2007 |
| JP | 2007-536662 A | 12/2007 |
| JP | 2008-177801 A | 7/2008 |
| JP | 2008-205737 A | 9/2008 |
| JP | 2010-218110 A | 9/2010 |
| WO | WO 2006/108299 A1 | 10/2006 |

OTHER PUBLICATIONS

C. Tomasi, et al., "Bilateral Filtering for Gray and Color Images", Proc. Sixth Int'l Conf. Computer Vision, 1998, pp. 839-846.

Hiroshi Harashima, et al., "e-Separating Nonlinear Digital Filter and Its Applications", The transaction A of the Institute of Electronics, Information and Communication Engineers, vol. J65-A, No. 4, pp. 297-304, Translation of Outline 1982.

* cited by examiner

FIG.4
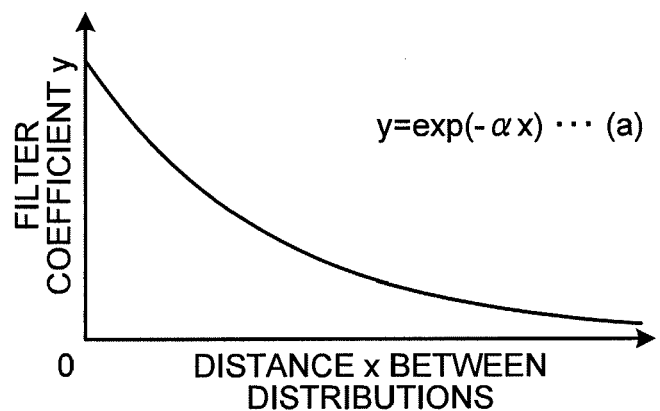
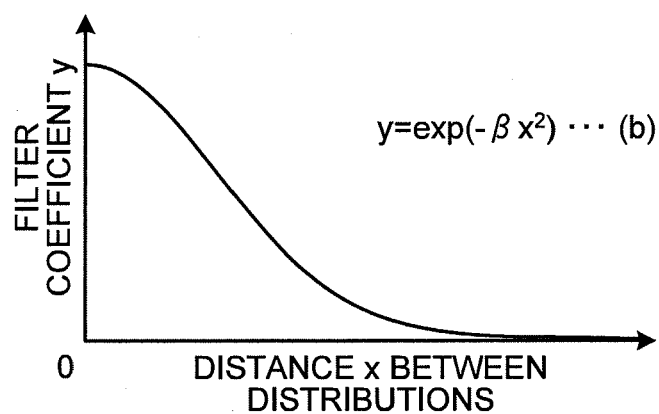
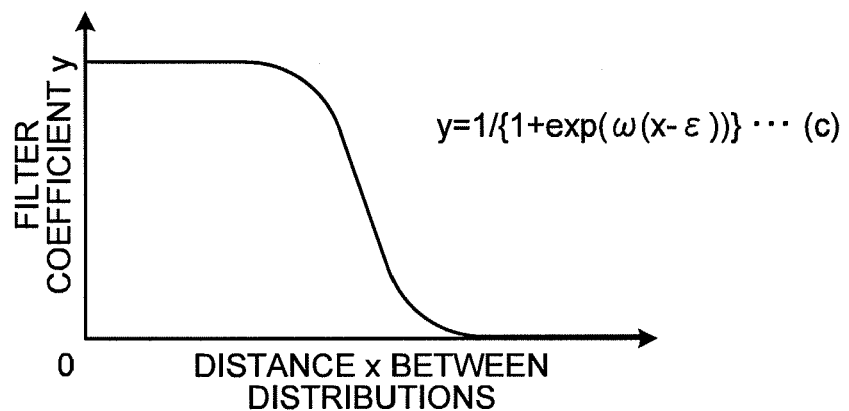

IMAGE PROCESSING APPARATUS, IMAGE PROCESSING METHOD, AND COMPUTER PROGRAM

TECHNICAL FIELD

The present invention relates to an image processing apparatus, an image processing method, and a computer program that reduces noise in image data.

BACKGROUND ART

Images taken by an image capture device, such as a scanner and a digital camera, contain noise, such as dark-current noise, thermal noise, and shot noise. This noise depends on the characteristics of the imaging elements and circuits. To form a high-quality image, a process is needed that reduces the noise. However, if the noise is reduced in a simple manner using a low-pass filter, elements such as edges that are important to making an image recognizable to a viewer of the image are lost and, eventually, the quality of the image is reduced. Therefore, a technology is required for noise reduction that is in accordance with the characteristics of different sections of the image.

One such noise reduction technology uses an ε filter (see Non-patent document 1: "ε-Separating Non-linear Digital Filter and Its Application," The transactions A of the Institute of Electronics, Information and Communication Engineers, Vol. J65-A, No. 4, pp. 297-304, 1982 by Hiroshi Harashima, Kaoru Odajima, Yoshiaki Shishikui, and Hiroshi Miyagawa). The ε filter can replace the pixel value of a focus pixel with the average value of pixels that are selected from surrounding pixels in such a manner that the difference between the signal of the focus pixel and the signal of each selected pixel is less than or equal to a threshold, thereby reducing noise while maintaining components, such as edges, that have a large signal difference.

Moreover, with a technology using a bilateral filter (see Non-patent document 2: "Bilateral Filtering for Gray and Color Images," Proc. Sixth Int'l Conf. Computer Vision, pp. 839-846, 1998 by C. Tomasi and R. Manduchi), a filter coefficient is calculated for each surrounding pixel using the signal difference and the spatial distance between the focus pixel and the surrounding pixel, and then the pixel value of the focus pixel is replaced with the sum of the filter-coefficient multiplied pixel value of all the surrounding pixels. As with the ε filter, this technology also achieves both noise reduction and edge maintenance.

Various advanced ε filter/bilateral filter technologies have been disclosed. In an image capture system, etc., disclosed in Japanese Patent Application Laid-open No. 2008-205737 (Patent document 1), the distances between RGB values of the focus pixel and RGB values of the surrounding pixels are reflected in the filter coefficient. This enables an effective reduction of noise in a color image. With the image processing apparatus, etc., disclosed in Japanese Patent Application Laid-open No. 2007-288439 (Patent document 2), the difference between the color tone of the focus pixel and the color tone of the surrounding pixel is detected and the color-tone difference is then reflected in the filter coefficient, which enables smoothing in order to prevent the formation of a moiré pattern.

However, in the inventions related to the image processing apparatuses, etc., disclosed in the above patent documents 1 and 2, because the distance between individual pixels is reflected in the filter coefficient, if a high level of noise is present, an incorrect value is calculated as the distance between the pixels and an appropriate filter coefficient cannot be calculated, which disadvantageously reduces the noise reduction effect.

The present invention has been made to solve the above problems with the conventional technology, and an object of the present invention is to provide an image processing apparatus, an image processing method, and a computer program for calculating an appropriate filter coefficient so as to reduce noise while maintaining elements, such as edges, that are important to making an image recognizable to a viewer of the image.

DISCLOSURE OF INVENTION

Image processing apparatuses according to the present invention have the following configuration to achieve the above object.

An image processing apparatus according to the present invention includes a distance calculating unit that calculates a distance between first and second distributions, wherein the first distribution is a distribution of pixel values of pixels surrounding a focus pixel included in an image, the second distribution is a distribution of pixel values of pixels surrounding a pixel included in a window that includes the focus pixel at the center, and the second distribution is obtained for each pixel included in the window; a coefficient calculating unit that calculates, using the distance between the first and second distributions, a filter coefficient for each pixel included in the window; and a filter processing unit that calculates a correction value for the focus pixel by performing a filter process on each pixel included in the window using the filter coefficient.

This enables providing of an image processing apparatus, an image processing method, and a computer program that are used to calculate, even when the level of the noise is high, an appropriate filter coefficient so as to reduce noise while maintaining elements, such as edges, that are important to making an image recognizable to a viewer of the image.

The present invention that solves the above problems can be implemented as an image processing method used in the image processing apparatus, and a computer program that causes a computer to execute the image processing method.

With the image processing apparatus, the image processing method, and the computer program according to the present invention, an image processing apparatus, an image processing method, and a computer program are provided that calculate, even when the level of noise is high, an appropriate filter coefficient so as to reduce noise while maintaining elements, such as edges, that are important to making an image recognizable to a viewer of the image.

BRIEF DESCRIPTION OF DRAWINGS

FIG. 4 is graphs of the filter coefficients plotted against the distance between distributions according to the given functions.

BEST MODE(S) FOR CARRYING OUT THE INVENTION

Exemplary embodiments of the present invention are described in detail below with reference to the accompanying drawings.

EMBODIMENTS OF THE PRESENT INVENTION

First Embodiment

Calculation of Pixel-Value Distance Between Distributions Using Averages (Grayscale Image)

In an example described in the first embodiment, an image to be processed is a grayscale image and the pixel-value distance between distributions is the distance between averages.

Figure 1:
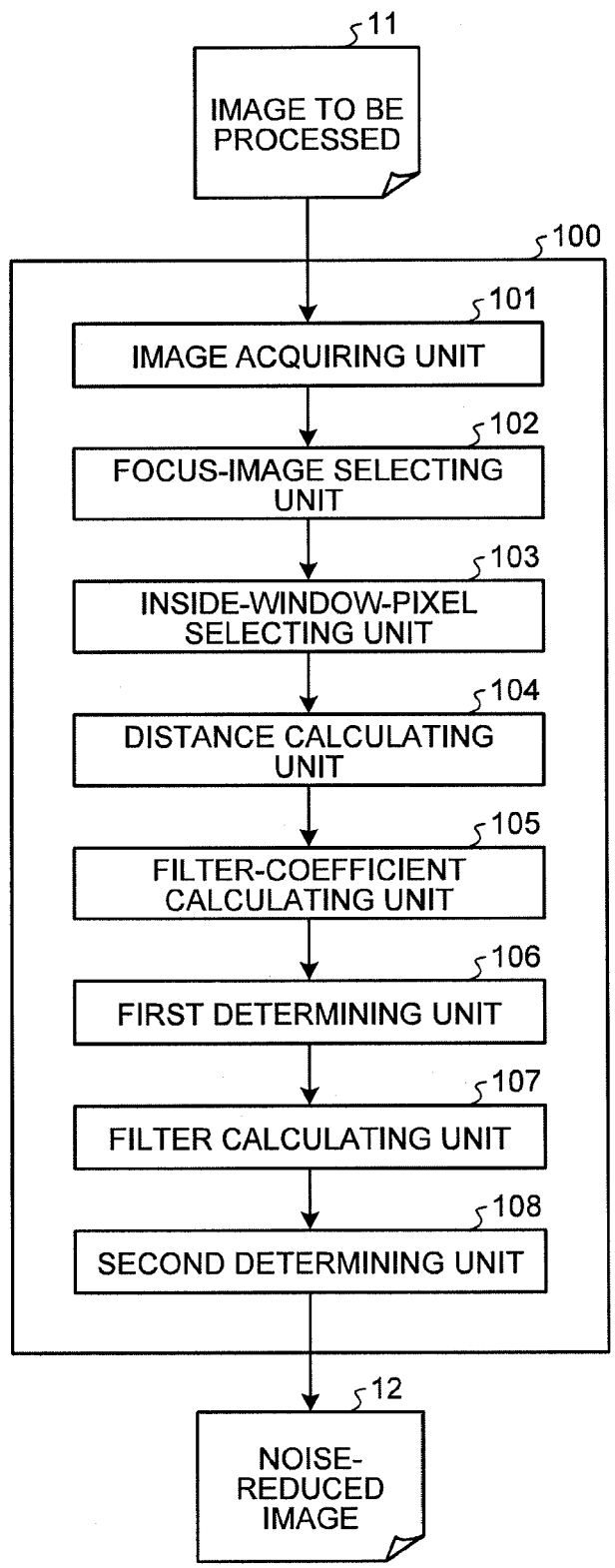
FIG. 1 is a functional diagram of an example of an image processing apparatus according to the first embodiment.

FIG. 1 is a functional diagram of an example of an image processing apparatus according to the first embodiment. An image processing apparatus 100 receives an image to be processed 11 and outputs a noise-reduced image 12. The image processing apparatus 100 includes an image acquiring unit 101, a focus-image selecting unit 102, a inside-window-pixel selecting unit 103, a distance calculating unit 104, a filter-coefficient calculating unit 105, a first determining unit 106, a filter calculating unit 107, and a second determining unit 108.

The image acquiring unit 101 receives the image to be processed 11. The focus-image selecting unit 102 selects a focus pixel from the image to be processed 11. The inside-window-pixel selecting unit 103 selects one inside-window pixel from pixels inside a window, where the window is defined so as to surround the focus pixel. The distance calculating unit 104 calculates the distance between a distribution of pixel values of pixels surrounding the focus pixel and a distribution of pixel values of pixels surrounding the pixel selected by the inside-window-pixel selecting unit 103.

The filter-coefficient calculating unit 105 calculates, using the distance calculated by the pixel-value-distance-between-distributions calculating unit 104, a filter coefficient for the pixel selected by the inside-window-pixel selecting unit 103. The first determining unit 106 determines whether each of the inside-window-pixel selecting unit 103, the distance calculating unit 104, and the filter-coefficient calculating unit 105 has completed the process for every pixel inside the window. The filter calculating unit 107 performs filter calculation for the pixels inside the window using the filter coefficient that is calculated by the filter-coefficient calculating unit 105. Thus, as a result of the filter process, a correction value for the focus pixel is calculated.

The second determining unit 108 determines whether every pixel of the image to be processed 11 has been selected by the focus-image selecting unit 102 and subjected to the filter calculation.

Figure 2:
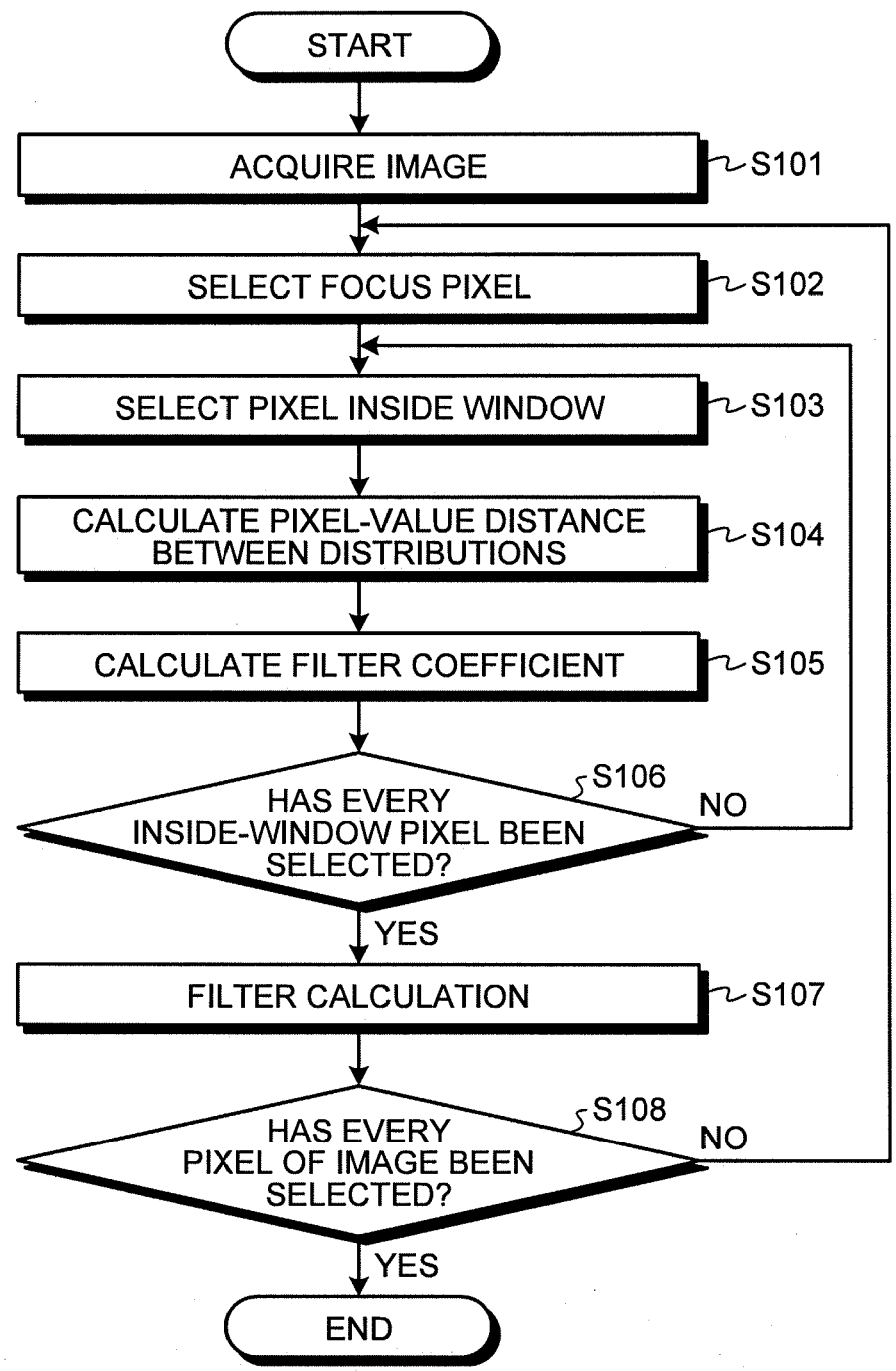
FIG. 2 is a flowchart of an image processing method according to the first embodiment.

FIG. 2 is a flowchart of an image processing method according to the first embodiment. In the image processing method shown in FIG. 2, the units of the image processing apparatus 100 process the received image to be processed 11 and output the noise-reduced image 12.

At Step S101 of FIG. 2, the image acquiring unit 101 acquires the image to be processed 11.

At Step S102, the focus-image selecting unit 102 selects the focus image from the image to be processed 11. The order of selection is not limited. For example, the pixels can be selected sequentially by a raster scanning.

At Step S103, the inside-window-pixel selecting unit 103 selects one pixel from the pixels inside the window that has been defined to surround the focus pixel. The shape of the window is not limited and can be rectangular or elliptical.

At Step S104, the distance calculating unit 104 calculates the distance between the distribution of the pixel values of pixels surrounding the focus pixel and the distribution of the pixel values of pixels surrounding the inside-window pixel selected at Step S103.

Figure 3:
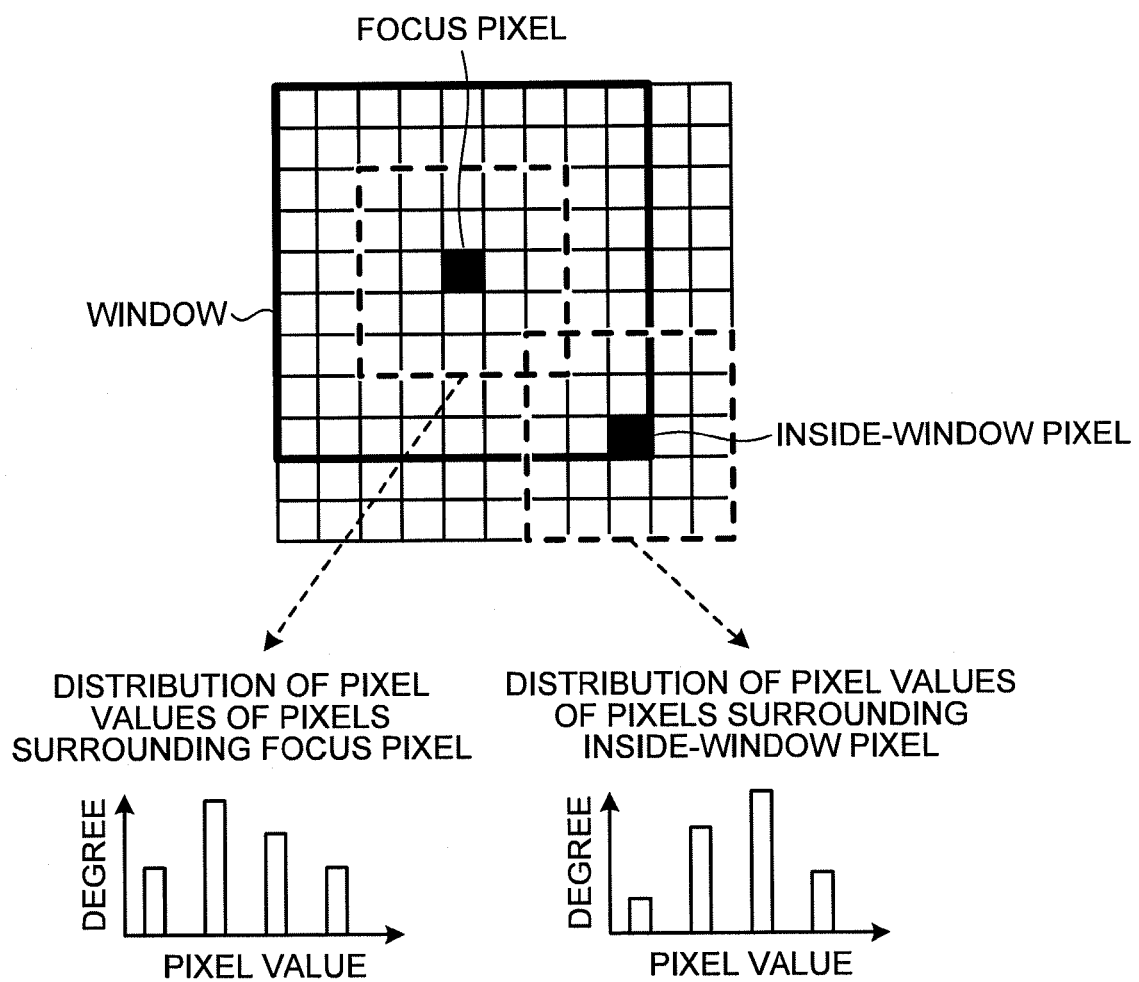
FIG. 3 is a schematic diagram of an example of a distribution of pixel values of pixels surrounding a focus pixel and an example of a distribution of pixel values of pixels surrounding an inside-window pixel.

FIG. 3 is a schematic diagram of an example of the distribution of the pixel values of pixels surrounding the focus pixel and an example of the distribution of the pixel values of pixels surrounding the inside-window pixel. Each square block shown in FIG. 3 represents one pixel. The window is made up of 9×9 pixels. Each of the distribution of pixel values of 5×5 pixels within a rectangular area surrounding the focus pixel and the distribution of pixel values of 5×5 pixels within another rectangular area surrounding the one inside-window pixel is created as a histogram. At Step S104, for example, the average of each rectangular area is calculated using the distributions shown in FIG. 3 and then the distance between the averages is calculated.

At Step S105, the filter-coefficient calculating unit 105 calculates the filter coefficient using the distance between the distributions calculated at Step S104. In the first embodiment, a certain threshold $\epsilon$ is provided and if the distance between the distributions is more than or equal to the threshold $\epsilon$, the filter coefficient is set to 0, while if the determination is negative, the filter coefficient is set to 1. This enables filter calculation to exclude the usage of any pixels that belong to a section different from the section that contains the focus pixel. As a result, elements, such as edges, that are important to making an image recognizable to a viewer of the image remain unchanged.

At Step S106, the first determining unit 106 determines whether every pixel inside the window has been selected. If every pixel has been selected, the process control goes to Step S107 and, if the determination is negative, the process control returns to Step S103.

At Process Step S107, the filter calculation is performed using the filter coefficient calculated by the filter calculating unit 107. The process involves, more particularly, multiplying each pixel value by the corresponding filter coefficient and adding up the products for all the pixels inside the window. The sum is then divided by the sum of the filter coefficients, thereby performing normalization. The quotient is set as the pixel value of the corresponding pixel of the noise-reduced image 12.

At Process Step S108, the second determining unit 108 determines whether every pixel of the image to be processed has been selected. If an unselected pixel is found, the process control returns to Process Step S102 and if every pixel has been selected, the noise-reduced image 12 is output and the process comes to an end.

In the first embodiment, by using the distance between the distributions at Step S104, a filter coefficient robust to noise is calculated. Moreover, although, in the present embodiment, the filter coefficient is a binary value that is set to either 0 or 1 at Step S105, the filter coefficient can be a multiple value in order to perform a more accurate process. For example, a filter coefficient y can be calculated using a distance x between distributions with the monotonically decreasing positive functions shown in FIG. 4. FIG. 4 illustrates three functions (a) to (c) as examples. The Greek letters contained in Equations (a) to (c) of FIG. 4 are parameters and they are set in accordance with, for example, applications of the image processing apparatus. It is noted that, in the function expressed by Equation (c), if co approaches infinity, it approaches the above-described manner of switching the filter coefficient between 0 and 1 using the threshold $\epsilon$.

Second Embodiment

Calculation of Pixel-Value Distance Between Distributions Using Averages (Color Image)

In an example described as the second embodiment, an image to be processed is a color image and the pixel-value distance between distributions is the distance between averages.

The image processing apparatus 100 according to the second embodiment has the same functional configuration as shown in FIG. 1 and operates in the same manner as in the first embodiment except for the operation of the distance calculating unit 104. Therefore, the distance calculating unit 104 will be described herein.

Although a gray image that is processed according to the first embodiment has only one type of average, a color image has three bases, and thus three-dimensional vectors are present. Therefore, for example, the average of each of R, G, and B is calculated. It is assumed that the averages in R, G, and B of the pixels surrounding the focus pixel are set to R0, G0, and B0, respectively, and the averages in R, G, and B of the pixels surrounding the inside-window pixel are set to R1, G1, and B1, respectively. Using these values, the distance D between the distributions is calculated as expressed in Equations (1) and (2):

$$D = \alpha|R_0 - R_1| + \beta|G_0 - G_1| + \gamma|B_0 - B_1| \quad (1)$$

$$D = \sqrt{\alpha|R_0 - R_1|^2 + \beta|G_0 - G_1|^2 \gamma|B_0 - B_1|^2} \quad (2)$$

In Equations (1) and (2), $\alpha$, $\beta$, and $\gamma$ are parameters that are set in accordance with, for example, applications of the image processing apparatus 100 so as to keep the balance among R, G, and B. Equation (3) defines the distance D between the distributions depending on a real number p by generalizing Equations (1) and (2); Equation (4) defines the distance D between the distributions using color difference.

$$D = (\alpha|R_0 - R_1|^p + \beta|G_0 - G_1|^p + \gamma|B_0 - B_1|^p)^{\frac{1}{p}} \quad (3)$$

$$D = \left( \alpha|(G_0 - R_0) - (G_1 - R_1)|^p + \beta|G_0 - G_1|^p + \gamma|(G_0 - B_0) - (G_1 - B_1)|^p \right)^{\frac{1}{p}} \quad (4)$$

It is allowable to use, instead of RGB, a Euclidean distance in a uniform color space, such as L*a*b* or L*u*v*. Moreover, because distributions of pixel values of pixels surrounding a pixel are used, even when a single-color pixel value is present at one pixel position as in a Bayer array, it is possible to calculate the pixel-value distance between distributions using the method of the second embodiment.

In the second embodiment, the process at Step S104 of FIG. 2 is performed by operation of the distance calculating unit 104 as described above.

Third Embodiment

Calculation of Pixel-Value Distance Between Distributions Using Averages and Variances (Grayscale Image)

In an example described in the third embodiment, an image to be processed is a grayscale image and the pixel-value distance between distributions is calculated using averages and variances of the distributions.

The image processing apparatus 100 according to the third embodiment has the same functional configuration as shown in FIG. 1 and operates in the same manner as in the first embodiment except for the operation of the distance calculating unit 104. Therefore, the distance calculating unit 104 will be described herein.

In the third embodiment, the distance calculating unit 104 calculates the pixel-value distance between distributions using averages and variances of the distributions. The process is performed as follows. First, a pixel-value average $m_0$ and a pixel-value variance $\sigma^2_0$ of the pixel values of pixels surrounding the focus pixel are calculated. Then, a pixel-value average $m_1$ and a pixel-value variance $\sigma^2_1$ of the pixel values of pixels surrounding the inside-window pixel are calculated. The distance D between distributions is calculated using these values with the following equation:

$$D = \frac{(m_0 - m_1)^2}{\sigma_0^2 + \sigma_1^2} \quad (5)$$

Equation (5) is an example. Some other equations can be used in the present embodiment, as long as the distance D between distributions increases with respect to the distance between the averages and decreases with respect to the magnitude of the variances.

In the third embodiment, the process at Step S104 of FIG. 2 is performed by operation of the distance calculating unit 104 as described above.

According to the third embodiment, a change in the surrounding pixel value due to noise is calculated as a variance. The distance is adjusted appropriately in accordance with the intensity of noise by dividing the distance between the averages by the variances; therefore, a filter coefficient robust to the noise is calculated.

Fourth Embodiment

Calculation of Pixel-Value Distance Between Distributions Using Averages and Variances (Color Image)

In an example described in the fourth embodiment, an image to be processed is a color image and the pixel-value distance between distributions is calculated using averages and variances of the distributions.

The image processing apparatus 100 according to the fourth embodiment has the same functional configuration as shown in FIG. 1 and operates in the same manner as in the first embodiment except for the operation of the distance calculating unit 104. Therefore, the distance calculating unit 104 will be described herein.

In the fourth embodiment, the distance calculating unit 104 calculates the pixel-value distance between distributions using averages (vector) and variance-covariance matrixes of the distributions. The process is performed as follows.

First, an average vector $\mu_0$ and a variance-covariance matrix $\Sigma_0$ of the pixel values of pixels surrounding the focus pixel are calculated. If the image to be processed 11 is an RGB image, the components of the average vector $\mu_0$ correspond to the RGB components, the diagonal component of the variance-covariance matrix $\Sigma_0$ represents the variance of RGB, and the non-diagonal component of the variance-covariance matrix $\Sigma_0$ represents the covariance of RGB.

In the same manner, an average vector $\mu_1$ and a variance-covariance matrix $\Sigma_1$ of the pixel values of pixels surrounding the one inside-window pixel are calculated. The distance D between distributions is calculated using these values with the following equation (6):

$$D=(\mu_0-\mu_1)^T(\Sigma_0+\Sigma_1)^{-1}(\mu_0-\mu_1) \quad (6)$$

Alternatively, a linear discriminant analysis is used. A direction e (unit vector) is calculated so that the correlation ratio (ratio of a between-class variation against the total variation) marks the maximum and then the average and the variance in the direction e are calculated, thus, the same method according to the third embodiment is then available. An average $m_i$ and a variance $\sigma^2_i$ in the direction e are calculated using the following equations (7) and (8):

$$m_i \leftarrow e^T \mu_i \quad (7)$$

$$\sigma_i^2 \leftarrow e^T \Sigma_i e \quad (8)$$

In the fourth embodiment, the process at Step S104 of FIG. 2 is performed by operation of the distance calculating unit 104 as described above.

According to the present embodiment, the distance between distributions is calculated with the correlation among the color components taken into consideration and the robust filter coefficient is calculated even when the color image contains noise.

Fifth Embodiment

Calculation of Pixel-Value Distance Between Distributions Using Kullback-Leibler Information In an example described in the fifth embodiment, the pixel-value distance between distributions is calculated using Kullback-Leibler information.

The image processing apparatus 100 according to the fifth embodiment has the same functional configuration as shown in FIG. 1 and operates in the same manner as in the first embodiment except for the operation of the distance calculating unit 104. Therefore, the distance calculating unit 104 will be described herein.

In the fifth embodiment, the distance calculating unit 104 calculates the pixel-value distance between distributions using Kullback-Leibler information. The process is performed as follows.

First, a histogram P(x) of the pixel values of pixels surrounding the focus pixel is created. It is assumed that a pixel value x is discretized appropriately. Regardless whether the image is a gray image or a color image, the histogram is created by appropriately discretizing the pixel-value space. In the same manner, a histogram Q(x) of the pixel values of pixels surrounding the inside-window pixel is created. The distance D between distributions is calculated using these values with the following equation (9):

$$D = \sum_x P(x) \log \frac{P(x)}{Q(x)} \quad (9)$$

The distance D between distributions of Equation (9) corresponds to Kullback-Leibler information. Although a mathematical axiom related to distance is not satisfied, in the present embodiment, this is used as the distance between distributions. It is possible to replace P(x) and Q(x) of Equation (9) with each other.

In the fifth embodiment, the process at Step S104 of FIG. 2 is performed by operation of the distance calculating unit 104 as described above.

According to the fifth embodiment, even when the distribution of the surrounding pixel values is not normally distributed as observed in most cases, an appropriate filter coefficient is calculated.

Sixth Embodiment

Calculation of Pixel-Value Distance Between Distributions Using Distance Between Pixels in a Pair of Pixels In an example described in the sixth embodiment, the pixel-value distance between distributions is calculated using the distance between pixels that are in a pair.

The image processing apparatus 100 according to the sixth embodiment has the same functional configuration as shown in FIG. 1 and operates in the same manner as in the first embodiment except for the operation of the distance calculating unit 104. Therefore, the distance calculating unit 104 will be described herein.

In the sixth embodiment, the distance calculating unit 104 calculates the pixel-value distance between distributions using the distance between pixels that are in a pair. The process is performed as follows.

Figure 5:
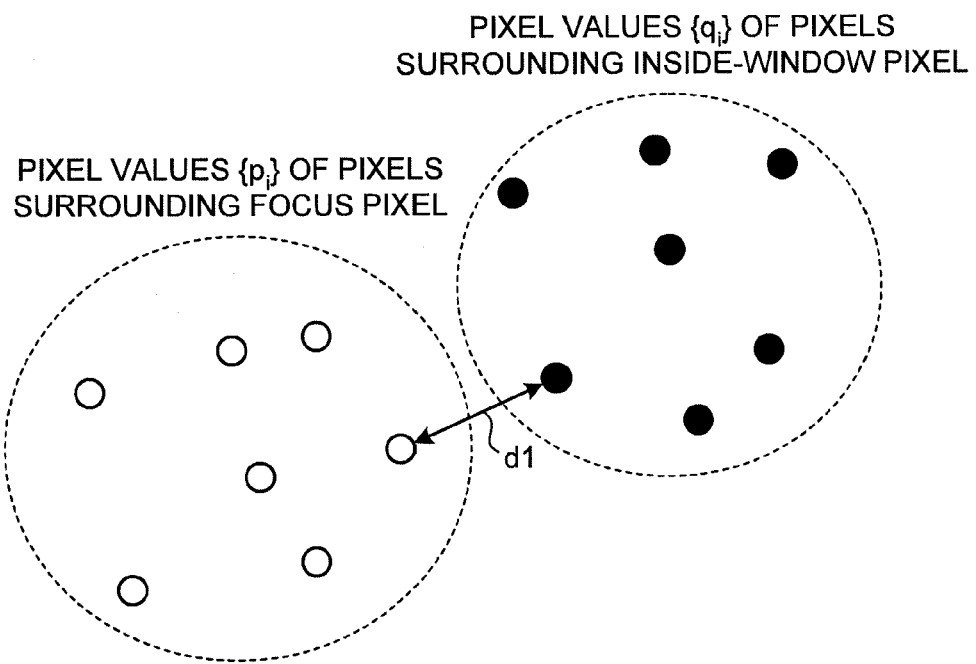
FIG. 5 illustrates the distance between pixels that have pixel values closest to each other.

The distance is calculated between pixels that have pixel values closest to each other, where one pixel is selected from pixels surrounding the focus pixel and having pixel values {pi}, and the other pixel is selected from pixels surrounding the inside-window pixel and having pixel values {qi}. FIG. 5 illustrates the distance between pixels having pixel values closest to each other. The distance d1 shown in FIG. 5 is the distance between the pixels having pixel values closest to each other. In the following equation (10), the pixel-value distance D between distributions represents the distance between the pixels having pixel values closest to each other:

$$D = \min_{i,j} \|p_i - q_j\| \quad (10)$$

In Equation (10), $\|\cdot\|$ is a norm defined by a pixel-value space.

Figure 6:
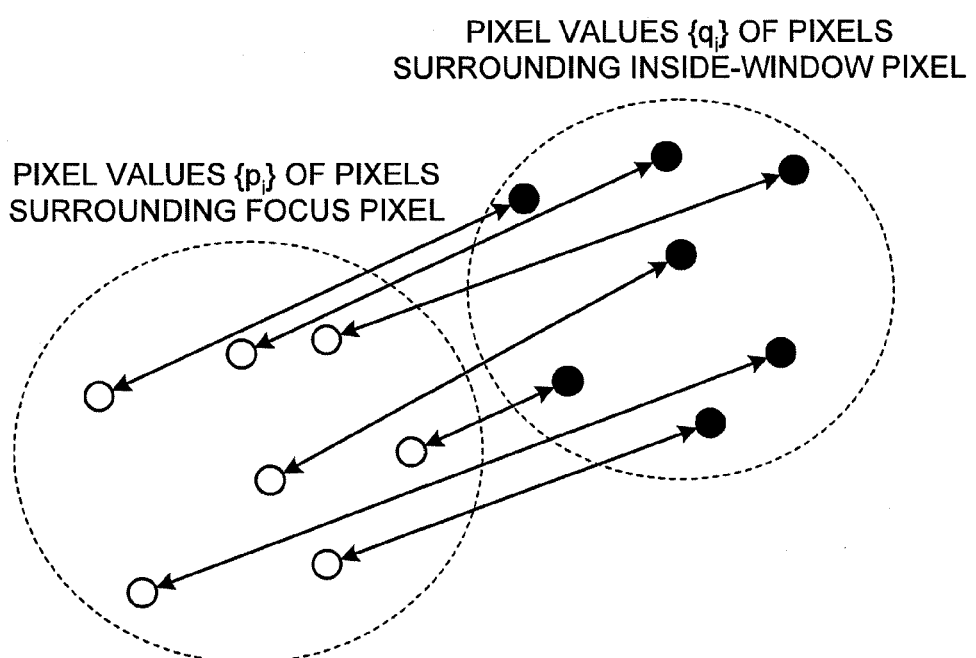
FIG. 6 illustrates the distance between pixels in each pair.

Alternatively, it is allowable to associate the pixel values {pi} of pixels surrounding the focus pixel with the pixel values Nil of pixels surrounding the inside-window pixel in a one-on-one manner so that the sum of the distances between each pixel in each pair of pixels has the lowest value and set this sum as the distance between the distributions. FIG. 6 illustrates the distance between pixels in each pair. The sum of the distances indicated by the arrows shown in FIG. 6 is set as the pixel-value distance D between distributions. The lowest sum of the distances between each pixel in each pair of pixels is calculated using, for example, a weighted matching algorithm to produce a bipartite graph. The pixel-value distance D between distributions is expressed by the following equation (11), where S is the collection of the pairs with no overlapped pixel:

$$D = \min_{S} \sum_{(i,j) \in S} \|p_i - q_j\| \quad (11)$$

In the sixth embodiment, the process at Step S104 of FIG. 2 is performed by operation of the distance calculating unit 104 as described above.

According to the sixth embodiment, the distance is calculated without using statistics; therefore, even when there are few surrounding pixels, the distance is calculated robustly and the filter coefficient is then set.

Seventh Embodiment

Reflection of the Spatial Distance

In any of the first embodiment to the sixth embodiment, the distance between the distribution of the pixel values of pixels surrounding the focus pixel and the distribution of the pixel values of pixels surrounding the inside-window pixel is reflected in the filter coefficient. In the present embodiment, the spatial distance between the focus pixel and the inside-window pixel is also reflected in the filter coefficient. For example, a bilateral filter is used.

Figure 7:
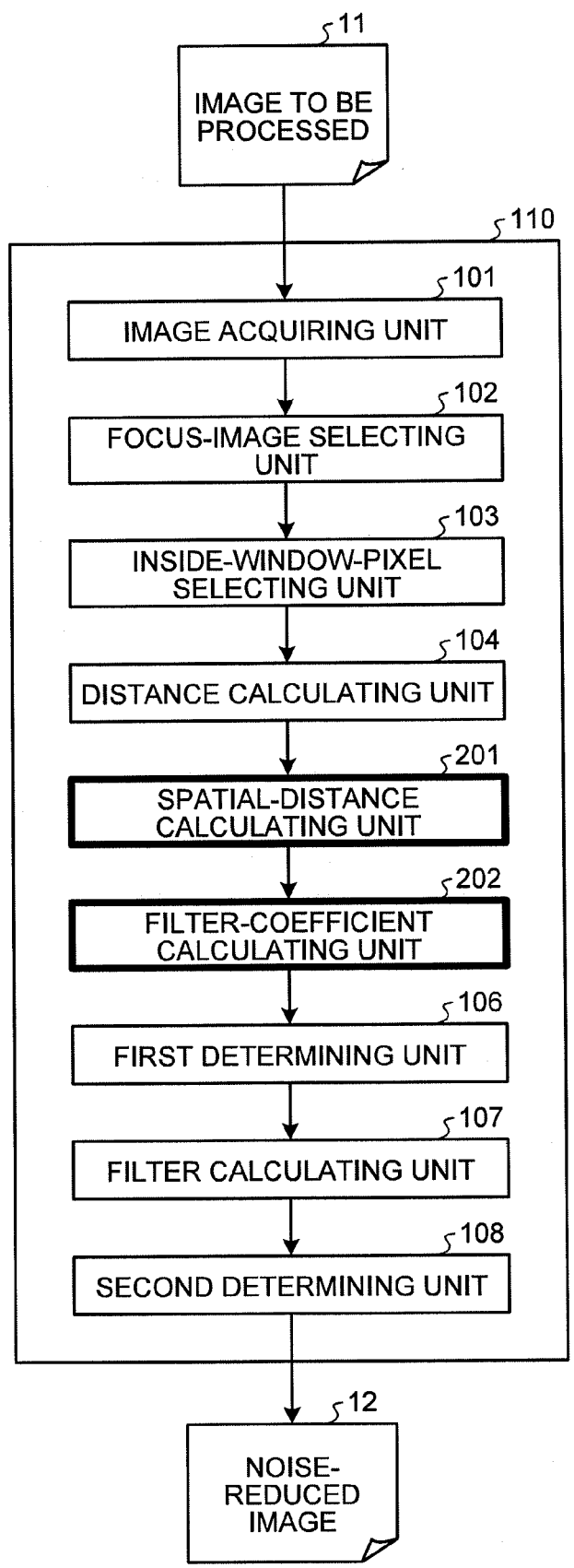
FIG. 7 is a functional diagram of an example of an image processing apparatus according to the seventh embodiment.

FIG. 7 is a functional diagram of an example of an image processing apparatus 110 according to the seventh embodiment. The image processing apparatus 110 includes the image acquiring unit 101, the focus-image selecting unit 102, the inside-window-pixel selecting unit 103, the distance calculating unit 104, a spatial-distance calculating unit 201, a filter-coefficient calculating unit 202, the first determining unit 106, the filter calculating unit 107, and the second determining unit 108.

The image processing apparatus 110 includes not only the components of the image processing apparatus 100 shown in FIG. 1 but also the spatial-distance calculating unit 201. The units of the image processing apparatus 110 shown in FIG. 7 that have the same function and the configuration as those of the image processing apparatus 100 shown in FIG. 1 are denoted with the same reference numerals and the same description is not repeated.

The spatial-distance calculating unit 201 calculates the spatial distance between the focus pixel and the inside-window pixel. More particularly, the spatial position (two-dimensional vector) of the focus pixel is set to $u_0$, the spatial position of the inside-window pixel is set to $u_1$, and a spatial distance D' is expressed using the norm $\|\bullet\|$ as in the following equation (12):

$$D' = \|u_0 - u_1\| \quad (12)$$

The filter-coefficient calculating unit 202 calculates the filter coefficient. More particularly, the filter-coefficient calculating unit 202 substitutes each of the pixel-value distance D between distributions that is calculated in the manner explained in any of the first embodiment to the sixth embodiment and the spatial distance D' calculated by the spatial-distance calculating unit 201 for an argument x of any of the functions (a) to (c) shown in FIG. 4, thereby calculating the filter coefficient. The filter-coefficient calculating unit 202 multiplies the calculated two coefficients and sets the product to be the filter coefficient.

Figure 8:
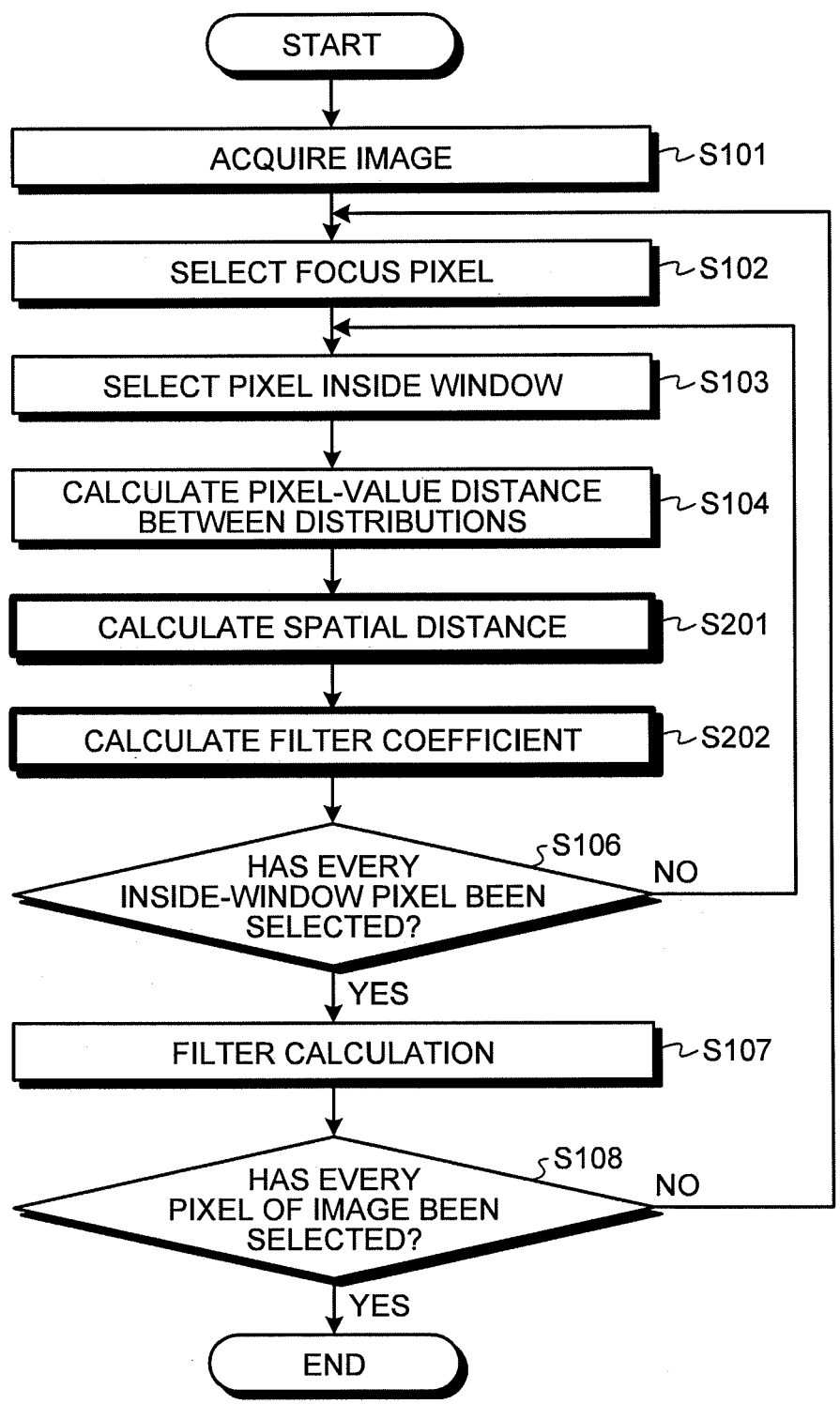
FIG. 8 is a flowchart of an image processing method according to the seventh embodiment.

FIG. 8 is a flowchart of an image processing method according to the seventh embodiment. The steps of FIG. 8 the same as those in the image processing method described with reference to FIG. 2 are denoted with the same step numbers and the same description is not repeated. The image processing method of FIG. 8 has Steps S201 and S202 instead of Step S105 of the image processing method of FIG. 2.

At Step S201, the spatial-distance calculating unit calculates the spatial distance D' using Equation (12). At Step S202, the filter-coefficient calculating unit 202 calculates the filter coefficient using both the pixel-value distance D between distributions and the spatial distance D'.

According to the seventh embodiment, because the spatial distance between the focus pixel and the inside-window pixel is taken into consideration, the pixel value of the pixel that is spatially close to the focus pixel i.e., the pixel that is expected to have a strong correlation with the focus pixel is reflected strongly in the filter processing.

(Implementation by Using a Computer or Similar)

The image processing apparatus according to the embodiments of the present invention can be implemented by using, for example, a personal computer or the like. The image processing method according to the embodiments of the present invention is performed, for example, when a CPU executes a program stored in a ROM, a hard disk device, or similar and loads the program on a main memory, such as a RAM, as a work area.

Although the best modes for implementing the invention are described, the present invention is not limited to the above embodiments that are described as the best modes. Various modifications are allowable within the scope of the present invention.

The invention claimed is:

1. An image processing apparatus comprising:
a distance calculating unit that calculates a distance between first and second distributions, wherein the first distribution is a distribution of pixel values of pixels surrounding a focus pixel included in an image, the second distribution is a distribution of pixel values of pixels surrounding a pixel included in a window that includes the focus pixel at the center, and the second distribution is obtained for each pixel included in the window;
a coefficient calculating unit that calculates, using the distance between the first and second distributions, a filter coefficient for each pixel included in the window; and
a filter processing unit that calculates a correction value for the focus pixel by performing a filter process on each pixel included in the window using the filter coefficient.

2. The image processing apparatus according to claim 1, wherein the distance between the first and second distributions is a distance between an average of the pixel values of the pixels surrounding the focus pixel and an average of the pixel values of the pixels surrounding the pixel included in the window.

3. The image processing apparatus according to claim 2, wherein, when the image is a color image, the averages of the pixel values that are used to calculate the distance between the first and second distributions are a three-dimensional vector, wherein components of the three-dimensional vector are averages of three color components contained in the pixel values.

4. The image processing apparatus according to claim 1, wherein the distance between the first and second distributions is calculated by dividing a distance between the average of the pixel values of the pixels surrounding the focus pixel and the average of the pixel values of the pixels surrounding the pixel included in the window by the sum of the variance of the pixel values of the pixels surrounding the focus pixel and the variance of the pixel values of pixels surrounding the pixel included in the window.

5. The image processing apparatus according to claim 1, wherein the distance between the first and second distributions is Kullback-Leibler information between the distribution of the pixel values of the pixels surrounding the focus pixel and the distribution of the pixel values of the pixels surrounding the pixel included in the window.

6. The image processing apparatus according to claim 1, wherein the distance between the first and second distributions is either (i) a distance between pixels that have pixel values closest to each other, where one pixel is selected from the pixels surrounding the focus pixel and the other pixel is selected from the pixels surrounding the pixel included in the window; or (ii) a lowest sum of distances, which is obtained by associating pixel values of the pixels surrounding the focus pixel with pixel values of the pixels surrounding the pixel included in the window in a one-on-one manner so that a sum of the distances between each pixel in each pair of pixels has the lowest value.

7. The image processing apparatus according to claim 1, wherein, when the distance between the first and second distributions is more than or equal to a predetermined value, the coefficient calculating unit sets the filter coefficient to 0.

8. The image processing apparatus according to claim 1, wherein the coefficient calculating unit uses a value of a dependent variable as a weighting for calculating the filter coefficient, wherein the dependent variable is a variable of a monotonically decreasing function that contains the distance between the first and second distributions as an independent variable.

9. An image processing method comprising:
calculating a distance between first and second distributions, wherein the first distribution is a distribution of pixel values of pixels surrounding a focus pixel included in an image, the second distribution is a distribution of pixel values of pixels surrounding a pixel included in a window that includes the focus pixel at the center, and the second distribution is obtained for each pixel included in the window;
calculating, using the distance between the first and second distributions, a filter coefficient for each pixel included in the window; and
calculating a correction value for the focus pixel by performing a filter process on each pixel included in the window using the filter coefficient.

10. A non-transitory, computer readable medium encoding a computer program that cause a computer to execute an image processing method, the method comprising:
calculating a distance between first and second distributions, wherein the first distribution is a distribution of pixel values of pixels surrounding a focus pixel included in an image, the second distribution is a distribution of pixel values of pixels surrounding a pixel included in a window that includes the focus pixel at the center, and the second distribution is obtained for each pixel included in the window;
calculating, using the distance between the first and second distributions, a filter coefficient for each pixel included in the window; and
calculating a correction value for the focus pixel by performing a filter process on each pixel included in the window using the filter coefficient.

* * * * *